United States Patent
Meyer, Sr.

(10) Patent No.: US 10,765,113 B2
(45) Date of Patent: Sep. 8, 2020

(54) TIME RELEASED WEED TREATMENT SYSTEM DEVICE AND METHOD

(71) Applicant: David Meyer, Sr., St. Bernard, LA (US)

(72) Inventor: David Meyer, Sr., St. Bernard, LA (US)

(*) Notice: Subject to any disclaimer, the term of this patent is extended or adjusted under 35 U.S.C. 154(b) by 0 days.

(21) Appl. No.: 16/107,700

(22) Filed: Aug. 21, 2018

(65) Prior Publication Data

US 2020/0060267 A1 Feb. 27, 2020

(51) Int. Cl.
*A01N 25/34* (2006.01)
*A01N 25/30* (2006.01)

(52) U.S. Cl.
CPC ............ *A01N 25/34* (2013.01); *A01N 25/30* (2013.01)

(58) Field of Classification Search
CPC .............................. A01N 25/34; A01M 21/043
See application file for complete search history.

(56) References Cited

U.S. PATENT DOCUMENTS

| | | | |
|---|---|---|---|
| 2,601,620 A | 6/1952 | Marshall | |
| 3,315,408 A | 4/1967 | Fisher | |
| 4,786,550 A | 11/1988 | McFarland et al. | |
| 5,224,292 A | 7/1993 | Anton | |
| 5,730,773 A * | 3/1998 | Farley | A01N 25/34 424/409 |
| 6,022,827 A | 2/2000 | Kumar et al. | |
| 6,233,867 B1 | 5/2001 | Gibson | |
| 6,357,176 B2 | 3/2002 | Baldwin et al. | |
| 2009/0019765 A1 | 1/2009 | Kosinski et al. | |
| 2009/0119941 A1* | 5/2009 | Sentz | A01G 13/0268 33/755 |
| 2014/0245660 A1* | 9/2014 | Rooney | A01G 13/0293 47/9 |

* cited by examiner

*Primary Examiner* — Michael B. Pallay
(74) *Attorney, Agent, or Firm* — Keaty Law Firm LLC

(57) ABSTRACT

This invention provides for a time released weed treatment system for maintaining a weed free garden space. This system enables creation and easy maintenance of weed free garden areas to allow for stronger overall garden health as well as provide greater control and use of space in gardening. The time release-based weed treatment system uses an elongated planar strip impregnated with the time release weed control/treatment mechanism. A plurality of spaced-apart cross cuts is formed along longitudinal edges of the strip to allow bending of the strip into an arcuate or angular configuration. Anchoring pins are provided for securing the strip flat on the ground in the selected location.

9 Claims, 2 Drawing Sheets

TIME RELEASED WEED TREATMENT SYSTEM DEVICE AND METHOD

BACKGROUND OF THE INVENTION

This invention relates to weed control systems, and more particularly, to a weed suppression and weed preventive strip to be positioned in a desired location in a garden.

Weeds are unwanted in a garden as they take up space; compete for nutrient resources with the desired plants; and add unwanted, typically rundown, look to the garden. As an artist dealing with living organisms, a gardener must balance the physiological requirements of the garden with its look and feel. In the context of art, artists may use negative space to help create or invoke emotion, texture, time, and to shape the image. Gardeners as artists use negative space to do the same, but they also use it to increase interactivity sometimes by creating paths and lines to draw the visitor or viewer of the garden and to create balance for the health of the garden, all while gardening for food or flowers. Maintaining negative weed free space also helps the gardener to control color. Therefore, to a gardener negative space is important. A gardener, seeking to create negative space in the past, might use bark, rocks, sand, or any variety of landscape filler, but weeds may still occur although on a lesser scale.

Because of the importance of the keeping a garden free of weeds for the health and look of the garden, a gardener will spend hours working on weeding or spraying the garden. By creating a thin strip that can be placed along or under the soil in negative space or as a barrier around already existing plants or garden sections, fine-tuned control is created for weed-free areas. Although there are soils and sods for delivering nutrients and/or designed to be harmful to weeds, these soils and sods are difficult to introduce to an already existing garden and therefore do not provide the ease of use nor the amount of control a thin strip can provide in creating negative space. A gardener also typically requires access to the plant roots, and using a harsh weed control chemical may destroy closely planted flower beds. Attempts have been made to solve this persistent problem.

For example, U.S. Pat. No. 6,022,827 for "Sod or Other Vegetation Having a Root Support Matrix with Beneficial Plant Adjuvants Thereon," issued on Feb. 8, 2000 to assignee E. I. du Pont de Nemours and Company, provides for a root support matrix that itself includes a mixture of soil and/or sand and shredded carpet pieces. The matrix has a beneficial plant adjuvant, such as plant nutrients, growth regulators, pesticides, or so forth, disposed on these shredded fabric pieces, which may preferably be in the form of shredded carpet pieces. The beneficial plant adjuvant is initially suspended in an aqueous solution of water and a degradable, slow-release, water-soluble liquid polymer. When dried, the polymer forms a coating on the surface of the shredded carpet pieces and encapsulates the beneficial plant adjuvants. As the coating degrades, the plant adjuvants are released into the soil for uptake by the plants U.S. Pat. No. 4,786,550 for "Meltblown and Coform Materials Having Application as Seed Beds," issued on Nov. 22, 1988 to assignee Kimberly-Clark Corporation, provides for a concept that is generally accomplished by providing a seedbed of meltblown material having seeds incorporated therein. In addition to the incorporation of seeds, there is also absorbent material incorporated, such as cellulose fibers, and superabsorbent materials, such as hydrogels. Specifically, the system is composed of a network of air-formed polymer fibers and wood fibers, and as well as seed and superabsorbent materials, which are securely held within the network of polymer and wood fibers. The fibers themselves are in turn mechanically held together. Any suitable additive may be provided with the non-woven meltblown polymer and grass seed composite, such as color, pesticides, or herbicides.

U.S. Pat. No. 6,357,176 for "Soilless Sod," issued on Mar. 19, 2002 to assignee Mississippi State University, provides for a soil- and grass seed-less sod precursor that contains a non-woven bio-cellulosic fiber mat and grass springs. The sod precursor may be used to produce a soil-free sod, which may in turn be useful for manufacturing athletic fields, golf courses, and laws. The sod precursor specifically features (a) grass springs, and (2) a non-woven mat that includes bio-cellulosic bast fibers, the springs being in contact with an upper surface of the mat, and wherein these bast fibers comprise at least 40% by weight cellulose, and the mat comprises at least 40% by weight of the bio-cellulosic bast fibers, where the sod precursor is soil-free and grass seed-free. In the product, other water-soluble adjuvants may be used in combination with the fertilizer, such as other nutrients, fungicides, algicides, weed killers, and so forth.

U.S. Pat. No. 6,233,867 for "Landscape Control Fabric with Mucilage," issued on May 22, 2001 to inventor Joseph L. Gibson, provides for a landscaping control fabric that allows gardeners and landscapers to custom design various outdoor planting projects. It provides a unique landscaping control fabric, pictured at right, that contains plural layers of time-releasing growth-enhancing and control products. Such products, contained on mucilage media on a water-pervious mesh layer, may be selected from a group consisting of fertilizers, fungicides, water saver crystals, vegetation foods, pre-emergent weed killers, and post-emergent weed killers. The landscaping control fabric is constructed such that it may be placed about selected vegetation in accordance with the wishes of the user.

U.S. Pat. No. 2,601,620 for a "Method and Device for Preparing Grass Seed for Planting," issued on Jun. 24, 1952 to inventor Preston F. Marshall, provides for a mat that incorporates seeds, such as lawn grass seeds, into fibrous material, and weaves the strands into an open mesh fabric. The open mesh fabric allows for uniform distribution of the seeds throughout the length and breadth of the fabric and allows for the fabric to be spread over the area to be seeded. Additionally, it may be retained in place by pegs or a thin cover of earth, or by other suitable means. Specifically, this method of seeding consists of entwining fine seeds in the filling yarns of an open mesh woven fabric at spaced intervals, laying the fabric on the area to be seeded, and securing it in place against removal by natural causes prior to germination of the seeds.

U.S. Pat. No. 3,315,408 for a "Soluble Fibrous Material for Controlling Soil Erosion," issued on Apr. 25, 1967 to inventor Sidney G. Fisher, provides for a product that prevents or eliminates soil erosion by providing a disintegrable covering over areas subject to soil erosion that have been seeded, providing a protection against erosion for those areas until erosion-preventing vegetation has germinated beneath the protective covering. It further provides a covering in the form of a woven or textile fabric featuring tubular and/or solid yarns in various patterns that have a controlled solubility and rate of disintegration. The covering may additionally constitute a mat of soluble material having holders molded therein, which would in turn be disposed in one or more overlying layers. These layers may require different periods of disintegration time for dissolving and with fertilizers, weed killers, and/or other soil treating agents confined in chambers for release and effectiveness after a predetermined interval has occurred.

U.S. Pat. No. 5,224,292 for a "Fibrous Mat for Growing Plants," issued on Jul. 6, 1993 to assignee E. I. du Pont de Nemours and Company, provides for a plant-growing nonwoven mat that features a layer of hollow synthetic organic fibers having in their lumens water-soluble plant adjuvants. These adjuvants may include plant nutrients, fungicides, algaecides, weed killers, pesticides, and so forth. The system provides slow release of these adjuvants to provide for enhanced and protected plant growth. The hollow polyester fibers may have lumens amounting to 10-40% of the fiber cross-section and may feature within the lumens a water-soluble plant adjuvant having a dry weight amounting to 0.5-15% of the total weight of the hollow fibers.

Lastly, U.S. Patent Application Publication No. 2009/0019765 for a "Plant Growth Medium," published on Jan. 22, 2009 by inventors Leonard Kosinski et al., discloses an artificial plant growth medium that may be useful as a substitute for naturally-produced soil in supporting plant growth. The medium includes a cohesive mass of polymer fiberballs, which may be composed of biodegradable and/or non-biodegradable polymer fibers for use in plant cultivation. The medium would preferably provide an optimal balance of water and air to support plant growth. Nutrients, fertilizers, fungicides, weed killers, and so forth, may be included in the plant growth medium. For example, suitable fungicides may include benomyl flusilazole and other triazoles, acylalanines, tridemorph, or morphlines (NUSTAR, RIDOMIL, or CALIXINE).

While the above approaches may be effective in certain situations, there exists a need for a method of weed control for negative spaces which is easy to place and replace in already existing gardens while offering a high level of control and customizability in placement and weed control effectiveness.

SUMMARY OF THE INVENTION

It is, therefore, an object of the present invention to prevent and kill weeds by being a delivery system for weed preventive and killing chemicals.

It is further an object of the present invention to release the weed preventive and killing chemicals over time by being in some way biodegradable or grated.

It is further an object of the present invention to be able to provide a weed control device that the gardener can position in any desired location for creating negative space.

It is further an object of the present invention to provide a weed-control device that can be retained in the desired location by a simple mechanical means, for instance a pin or anchor.

It is further an object of the present invention to be able to provide a weed control device that can be partially cut and bent to meet the spacing requirements.

It is further an object if the present invention to provide a weed-control strip that can easily blend into the surrounding landscape or be colored to accentuate the landscape, or that can be buried in the soil, depending on the gardener's choice.

It is further an object often present invention to provide a weed-control strip that can be easily replaced once the weed preventive and killing properties are exhausted.

It is further an object of the present invention to provide a weed-control device that can be used as a barrier around gardens and plants to prevent weeds or other plants from encroaching the protected area.

The present invention achieves these objectives by providing a weed-control device comprising a thin fibrous strip, having perpendicular cuts along the length to allow for horizontal turns, which is capable of releasing over time weed preventive and killing chemicals or causing hostile soil conditions for weeds. The mechanism for time being either based on biodegradation of the strip or in certain cases a chemically gated release wherein the rate of release is controlled by strip structure. The rate of chemical release and area of coverage may vary depending on the strip, thus granting strips that control narrower areas and other strips that control larger areas by putting out more chemicals at a faster rate.

Wherein the time release mechanism is controlled by biodegradation, the preferred embodiment of the strip will have layers of biodegradable fibers that contain chemicals for weed control. These fibers are degraded by interacting with the soil whereby temperatures will break them down and release the weed control over time. As one layer of fibers is depleted, then the next layer will begin degradation and so forth until all layers are exhausted or the strip is replaced. However, the strip is of such nature that any typical time gated method by biodegradation will be applicable and may be incorporated.

The time release mechanism is chemically gated where the strip may contain a structure that prevents the chemicals from escaping but through osmosis. As water passes through the strip, the chemicals are released with the water. By modifying the structure of the fibrous strip, the amount of water passing through may be limited and thus the rate of weed controlling chemicals may be controlled.

This invention provides for a time released weed treatment system for maintaining a weed free garden space. This system enables creation and easy maintenance of weed free garden areas to allow for stronger overall garden health as well as provide greater control and use of space in gardening.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
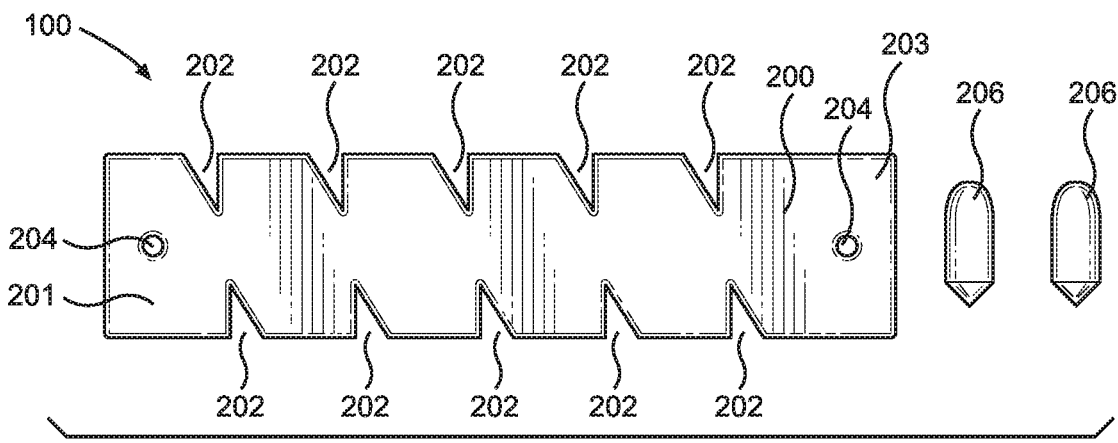
FIG. 1 is a top view of the weed control device of the present invention, showing the strip with cuts and pins, not yet assembled.
Figure 2:
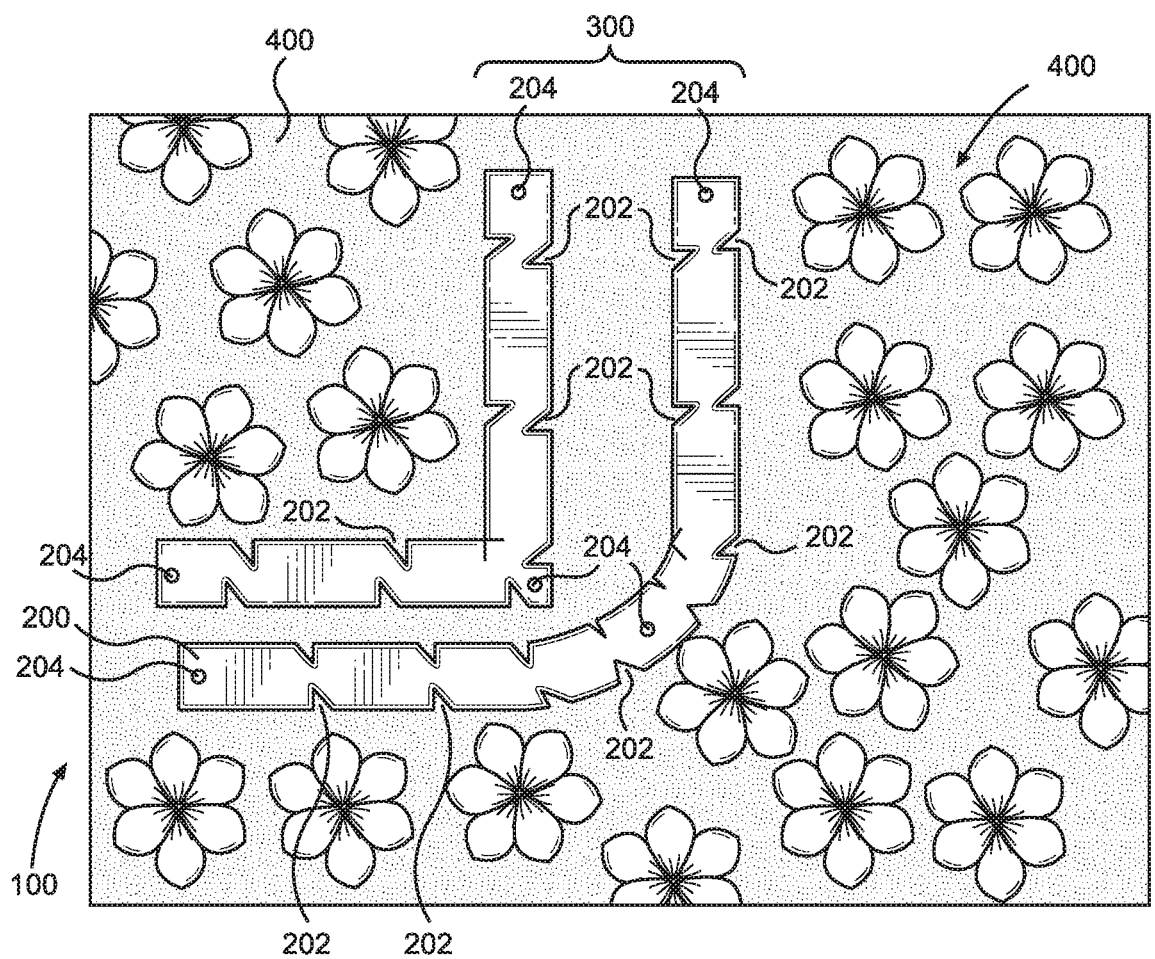
FIG. 2 is a schematic view of two weed control strips pinned on the soil between plants.
Figure 3:
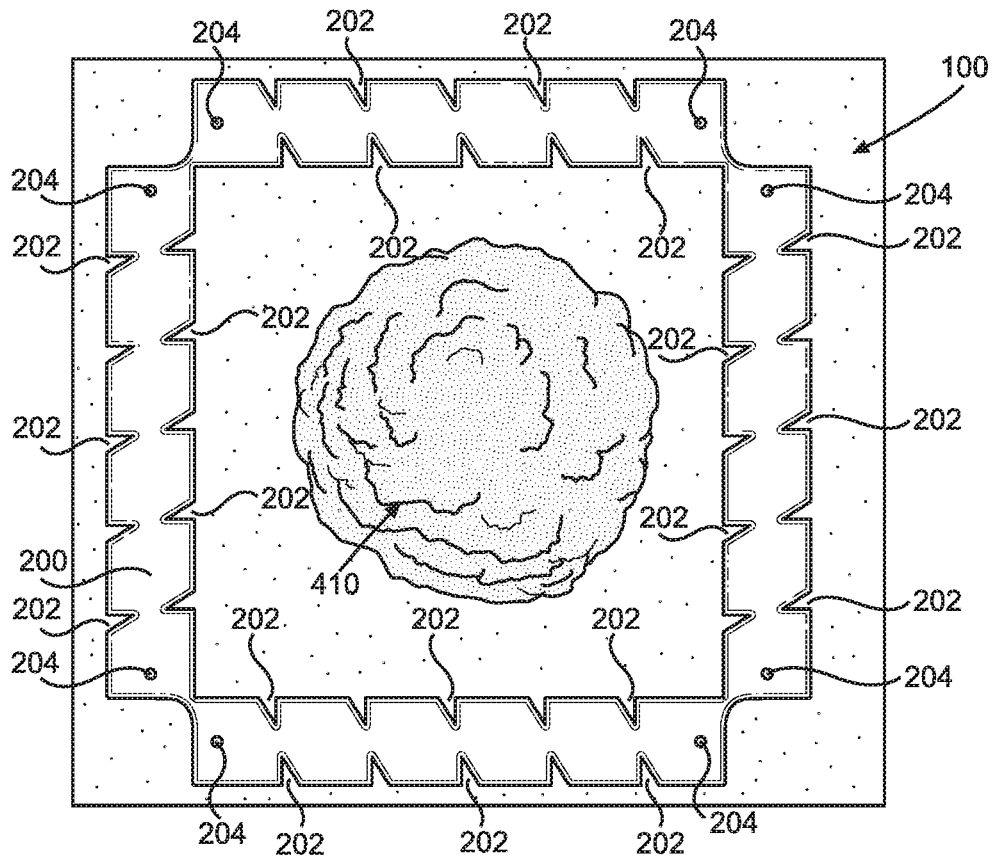
FIG. 3 is a schematic view of the weed control strip pinned on the soil around a small bush.
Figure 5:
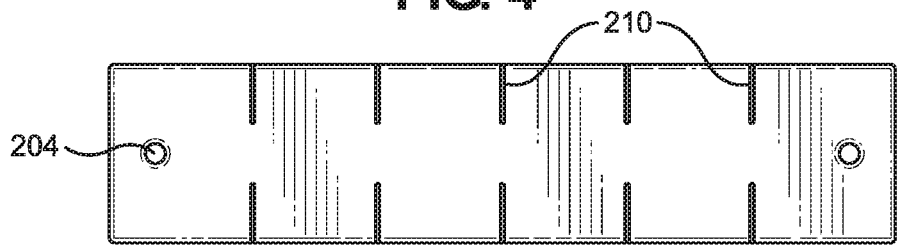
FIG. 5 is a plan view of an alternative embodiment of the present invention.

Referring now to the drawings in more detail, the time release weed control assembly is generally designated by numeral 100. The time release-based weed control/treatment system 100 of the present invention comprises an elongated substantially planar flexible strip 200 having a plurality of spaced-apart cutouts along its longitudinal edges, which allow the strip 200 to be bent or angled while still lying flat on the ground. The cutouts may be simple cross cuts or slits 210 formed perpendicularly to a longitudinal axis of the strip 200, as shown in FIG. 5, or the cutouts may be V-shaped cutouts 202, as shown in FIGS. 1-3.

The strip 200 has opposing narrow ends 201 and 203. An opening 204 is formed in each of the ends 201 and 203. A pair of anchoring pins or pegs 206 are provided for securing the strip flat on the ground in the selected location. Each of the pins 206 is sized and configured to be inserted into a respective opening 204 once the strip is positioned in a desired position in the garden. If desired, the strip 200 may be provided with a plurality of spaced openings along its length, and the system 100 may contain a plurality of pins 206 to secure the strip 200 in position by more than two anchoring pins 206.

Figure 4:
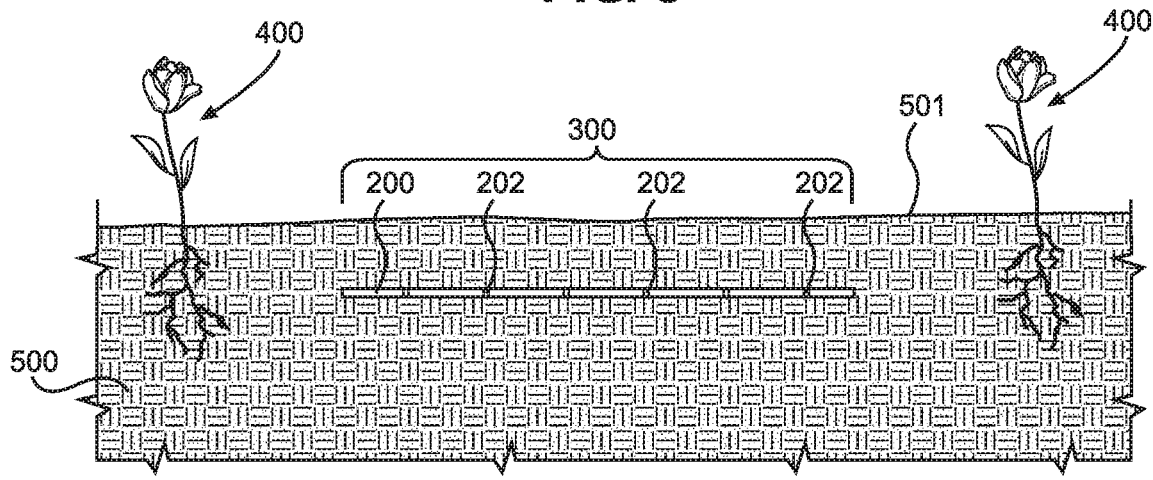
FIG. 4 is an end view of the weed control strip schematically shown placed under the soil surface.

The strip 200 is made from a fibrous material that has been impregnated with a time release herbicide or weed controlling substances. In use, the strip 200 can be either buried in the soil 500 below a ground level 501, as shown in FIG. 4, or anchored to the ground with the pins 206. The strip 200 may be designed of thickness and length suitable to the needs of the gardener and thus its configuration may vary widely. For instance, a narrow strip 200 provides for greater control and precision in delivery of the weed treatment but a wider strip 200 allows for more effective and larger area control.

In one aspect of the invention, the strip 200 is biodegradable and contains a time release mechanism for weed control/treatment, and the weed control substance may be included as nodules or beads in the fibrous strip 200. The nodules or beads have a water-soluble heat-reactive coating; and as the coating is washed way or heat-deteriorated, the weed control mechanism is dispersed into the soil, where it destroys the weeds and weed roots. Alternate embodiments of the present invention include but are not limited to structural type controls such as the strip containing herbicides, such that as the strip 200 receives water, the weed control substance is drawn out of the strip via osmosis. The structure and concertation of the strip 200 controls the rate of release.

The science of herbicides is a well-developed field and the strips 200 may include different mixtures of herbicides or have different weed controlling properties. The strips 200 may be layered to include at the surface, layers of herbicides targeted to immediately kill plants whereas the deeper layers may contain softer preemergence herbicides to prevent further plant growth. The herbicides released may include a number of herbicides that slow release themselves or are wholly reliant on a slow release mechanism: such as a 4-amnino-3, 5, 6-tricholo-2-pyri-dinecarboxylic acid in a starch xanthide, pine craft lignin, or any other herbicide used by the agricultural and gardening industry. The strip 200 may also deliver soil composition altering chemicals to the benefit of non-weed plants. The strip may contain light herbicides relying on sprays or other delivery methods by the gardener if weeds become too out of control.

In use, the strip 200 is placed along the negative space 400 of the garden 300, typically in-between desired plants, as shown in FIG. 2. The strip 200 may also be placed where the gardener wishes to create negative space. If the negative space is larger than the effective area of a strip 200, multiple strips 200 may be used, as shown in FIG. 2. The strip 200 may be placed around a desired plant, such as plant 410 shown in FIG. 3, or a garden area 400 to serve as a barrier to weed growth across that strip 200 formed barrier. A single strip 200 may be cut or bent into an arcuate (FIG. 2) or angular configuration (FIGS. 2 and 3) to fit around the plant 410 or garden 400. The strip 200 may be bent into multiple arcuate and angular configurations along its length. Also, multiple strips 200 may be placed around the plant 410 or garden area 400 when necessary.

Because of the flexibility of the strip 200, the gardener has many options for controlling weeds in a desired location. The gardener may secure the plant with pegs 206 by forcing the pegs 206 through the openings 204 and driving them into the ground. Alternatively, the gardener may place the strip below the surface 501 and covering the strip with top soil, securing the strip with or without the pins 206. The strip 200 may be stained certain colors to allow for styling or camouflaged to mimic the grass or plantings when the gardener desires that the strip 200 be less noticeable in the garden. The system 100 may contain a plurality of strips 200 having different widths, lengths and degree of weed control capabilities. The preferred embodiment comprises at least one biodegradable elongated strip 200 and a pair of pins 206.

Many changes and modifications can be made in the weed treatment system according to the present invention without departing from the spirit thereof. I therefore pray that my rights to the present invention be limited only by the scope of the appended claims.

I claim:

1. A method of controlling weeds, comprising the steps of:
   (i) providing a weed control device comprising at least one elongated flexible substantially planar strip impregnated with a time release weed control mechanism, the strip being provided with a plurality of spaced-apart cutouts formed along its longitudinal edges, allowing bending of the strip, and at least a pair of anchoring pins;
   (ii) laying the strip partially below a ground surface in a selected location; and
   (iii) bending the strip in the selected location, while retaining the strip flat in the ground.

2. The method of claim 1, comprising a step of securing the strip in the selected location with the at least pair of the anchoring pins.

3. The method of claim 2, wherein the strip has opposing narrow ends, wherein an opening is formed in each of the ends, and wherein the step of securing the strip in the selected location comprises a step of positioning an anchoring pin in each of the openings and driving the pin into the ground, thereby anchoring the strip in the selected location.

4. The method of claim 1, wherein the cutouts have a V-shaped configuration.

5. The method of claim 1, wherein the cutouts are cross slits formed perpendicularly to a longitudinal axis of the strip.

6. The method of claim 1, wherein the strip is formed from a biodegradable material, such that the time release weed control mechanism is released into the selected ground location as the strip degrades.

7. The method of claim 1, wherein the strip contains the time release weed control mechanism formed as nodules with a water-soluble heat-reactive coating so that the time release weed control mechanism is released into soil as the coating is washed away by water or degraded by heat.

8. The method of claim 1, wherein the strip is configured to be buried underground to deliver the time release weed control mechanism to weed roots.

9. The method of claim 1, wherein the strip is configured for bending into an arcuate or angular configuration when positioning the strip in the selected location on the ground.

* * * * *